United States Patent [19]

Emmerich

[11] Patent Number: 4,900,638
[45] Date of Patent: Feb. 13, 1990

[54] NICKEL-BASE SOLDER FOR HIGH-TEMPERATURE SOLDER JOINTS

[75] Inventor: Kurt Emmerich, Alzenau, Fed. Rep. of Germany

[73] Assignee: Vacuumschmelze GmbH, Fed. Rep. of Germany

[21] Appl. No.: 167,964

[22] Filed: Mar. 14, 1988

[30] Foreign Application Priority Data

Apr. 10, 1987 [DE]   Fed. Rep. of Germany ....... 3712271

[51] Int. Cl.$^4$ ............................................. B32B 15/00
[52] U.S. Cl. ..................................... 428/606; 148/403; 420/441
[58] Field of Search ......................... 420/441; 148/403; 428/606

[56] References Cited

U.S. PATENT DOCUMENTS

| | | | |
|---|---|---|---|
| 3,902,900 | 9/1975 | Restall et al. | 420/445 |
| 4,394,560 | 7/1983 | Kishida et al. | 219/137 WM |
| 4,396,822 | 8/1983 | Kishida et al. | 219/137 WM |
| 4,673,123 | 6/1987 | Shin et al. | 420/455 |

OTHER PUBLICATIONS

Steffens article (same as article (AR) on 1/24/89).
Steffens et al., "Benetzungsprobleme und ihre Beseitigung beim Hart—und Hochtemperaturloten", DVS 92, (1984), pp. 6–11.
K. Emmerich, "Rapidly Solidified Active Filler Alloys for Direct Brazing of Non—Metallized Ceramics", Sonderdruck aus der Proceedings of the 1st International Conference on Rapidly Solidified Materials, San Diego, CA, Feb. 3–5, 1986.

*Primary Examiner*—R. Dean
*Attorney, Agent, or Firm*—Hill, Van Santen, Steadman & Simpson

[57] ABSTRACT

Nickel-based solder compositions having improved wetting behavior, the soldering alloys containing aluminum and chromium, and one or more of the metals zirconium, niobium, or titanium added to the solder in amounts of from 0.1 to 5 atomic percent. Particularly effective soldering alloys contain 0 to 4 atomic percent iron, 0 to 21 atomic percent chromium, 0 to 19 atomic percent boron, 0 to 12 atomic percent silicon, 0 to 22 atomic percent phosphorus, 0 to 3 atomic percent carbon, and 0.1 to 5 atomic percent niobium, zirconium, or titanium, the remainder being nickel, the boron, carbon, silicon, and phosphorus concentrations totaling from 16 to 24 atomic percent.

3 Claims, No Drawings

NICKEL-BASE SOLDER FOR HIGH-TEMPERATURE SOLDER JOINTS

BACKGROUND OF THE INVENTION

Field of the Invention

The present invention is directed to a nickel-based solder or brazing composition for making joints for steels and nickel-base superalloys, particularly alloys containing aluminum and chromium.

Description of the Prior Art

High temperature materials containing aluminum and chromium tend to form significant amounts of oxide layers that make wetting with conventional solder compositions more difficult. The problem is particularly serious with high temperature materials that form an impervious oxide layer.

One example of an industrial process embodying these difficulties is that of soldering iron-chromium-aluminum steel bands to form honeycombed members for automobile emission catalyst carriers. In order to create strong and reliable solder joints in these and similar applications, the oxide layers must be removed before soldering, at least at the solder location. Very involved methods are usually required for eliminating these oxide layers such as annealing in air and subsequent pickling, annealing in a reducing atmosphere, annealing in a molten salt bath, ion etching, plasma cleaning methods, mechanical surface treatment, chemical pickling in various agents, electrolytic pickling and electrodeposition of metals such as nickel plating and copper plating. A detailed overview of such methods is described in the publication by Steffens et al, DVS Berichte 92 (1984) 6.

SUMMARY OF THE INVENTION

The present invention provides a nickel-based solder wherein the previous complex methods for eliminating oxide layers can be eliminated.

The nickel-base solder according to the present invention contains a sufficient amount of at least one of the metals zirconium, niobium or titanium to improve the wettability in the molten state.

It has been shown that a direct, good wetting of the solder locations at steels containing aluminum and chromium, or in nickel-based superalloys can be achieved by the addition of zirconium, niobium and/or titanium to the solder. A better wetting is also achieved by the solder when the material originally freed of the oxide skin again forms a thin oxide skin during the heating phase. The additives are preferably proportioned such that intermetallic phases are avoided during cooling from the soldering temperature. This is achieved when the additives amount to 0.1 to 5 atomic percent.

Particularly good results in accordance with the further development of the present invention is provided by a nickel-base solder having a composition of 0 to 4 atomic percent iron, 0 to 21 atomic percent chromium, 0 to 19 atomic percent boron, 0 to 12 atomic percent silicon, 0 to 22 atomic percent phosphorus, 0 to 3 atomic percent carbon, and 0.1 to 5 atomic percent niobium, zirconium, or titanium, or mixtures thereof, with the remainder being nickel, the total concentrations of boron, carbon, silicon and phosphorus being in the range of 16 to 24 atomic percent. Such a solder is particularly suited for soldering iron-chromium-aluminum steel bands to form honeycombed members for carriers for automobile emission catalysts.

The nickel-based solder of the invention is preferably used in the form of an essentially amorphous or partially crystalline foil having a thickness of 10 to 50 um, thus providing a uniform solder foil that contains no precipitates having a higher melting point. The methods for manufacturing quickly solidifying foils are known in the art and do not represent a part of the present invention.

As an example of the invention, 50 um thick foils of a composition of Fe-23% Cr-5% Al foils were soldered with solder foils having a thickness of 25 um. The base used was a standard solder known as L-Nila having a composition of $Ni_{60}Cr_{14}Fe_4Si_8B_{14}$. To this solder were added 0.5 and 1 atomic percent by weight titanium. It was found that the standard solder by itself exhibited an imperfect wetting of the Fe-Cr-Al foils, whereas the two solder foils having the Ti additive produced a significantly improved wetting.

It should be evident that various modifications can be made to the described embodiments without departing from the scope of the present invention.

I claim as my invention:

1. A nickel-base solder for producing high temperature solder joints in steel and nickel-base superalloys containing aluminum and chromium, said nickel-base alloy having substantially uniform amorphous composition throughout and consisting essentially of from approximately 0 to about 4 atomic percent iron, from approximately 0 to about 21 atomic percent chromium, from approximately 0 to about 19 atomic percent boron, from approximately 0 to about 12 atomic percent silicon, from approximately 0 to about 22 atomic percent carbon, and from approximately 0 to about 5 atomic percent of at least one of the metals niobium, zirconium, or titanium, the balance being essentially nickel, the sum of the boron, carbon, silicon and phosphorus contents being in the range of from approximately 16 to about 24 atomic percent.

2. A solder according to claim 1 in the form of a uniform ductile foil of amorphous composition having a thickness of 10 to 50 um.

3. A nickel-base solder having a substantially uniform amophous composition throughout for producing high temperature solder joints in steel and nickel-base superalloys containing aluminum and chromium, said nickel-base solder including at least one metal chosen from the group consisting of zirconium, niobium, and titanium, the total content of the zirconium, niobium, and titanium being approximately 0.1 to about 5 atomic percent of the solder.

* * * * *

UNITED STATES PATENT AND TRADEMARK OFFICE
CERTIFICATE OF CORRECTION

PATENT NO. : 4,900,638
DATED : Feb. 13, 1990
INVENTOR(S) : Kurt Emmerich

It is certified that error appears in the above—identified patent and that said Letters Patent is hereby corrected as shown below:

Column 2, line 42, before "carbon" insert --phosphorus, from approximately 0 to about 3 atomic percent--.

Signed and Sealed this

Twelfth Day of February, 1991

Attest:

HARRY F. MANBECK, JR.

*Attesting Officer*              *Commissioner of Patents and Trademarks*